(12) United States Patent
Filsfils et al.

(10) Patent No.: US 7,817,546 B2
(45) Date of Patent: Oct. 19, 2010

(54) QUASI RTP METRICS FOR NON-RTP MEDIA FLOWS

(75) Inventors: Clarence Filsfils, Brussels (BE); John H. W. Bettink, San Jose, CA (US); Stewart Frederick Bryant, Surrey (GB); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 321 days.

(21) Appl. No.: 11/774,343

(22) Filed: Jul. 6, 2007

(65) Prior Publication Data

US 2009/0010158 A1 Jan. 8, 2009

(51) Int. Cl.
  *H04L 12/26* (2006.01)
(52) U.S. Cl. .................. 370/231; 370/252; 370/389; 370/474
(58) Field of Classification Search .......... None
  See application file for complete search history.

(56) References Cited

U.S. PATENT DOCUMENTS

| | | | |
|---|---|---|---|
| 4,788,656 A | 11/1988 | Sternberger | |
| 4,907,277 A | 3/1990 | Callens et al. | |
| 4,996,663 A | 2/1991 | Nemes | |
| 5,414,704 A | 5/1995 | Spinney | |
| 5,450,449 A | 9/1995 | Kroon | |
| 5,617,421 A | 4/1997 | Chin et al. | |
| 5,699,478 A | 12/1997 | Nahumi | |
| 5,699,485 A | 12/1997 | Shoham | |
| 5,806,086 A | 9/1998 | Kimmel et al. | |
| 5,842,040 A | 11/1998 | Hughes et al. | |
| 5,884,010 A | 3/1999 | Chen et al. | |
| 5,898,837 A | 4/1999 | Guttman et al. | |
| 5,943,347 A | 8/1999 | Shepard | |
| 5,946,302 A | 8/1999 | Waclawsky et al. | |
| 5,956,721 A | 9/1999 | Douceur et al. | |
| 5,995,488 A | 11/1999 | Kalkunte et al. | |
| 5,995,971 A | 11/1999 | Douceur et al. | |
| 6,104,696 A | 8/2000 | Kadambi | |
| 6,185,208 B1 | 2/2001 | Liao | |
| 6,275,861 B1 | 8/2001 | Chaudri et al. | |
| 6,314,095 B1 | 11/2001 | Loa | |
| 6,341,130 B1 | 1/2002 | Lakshman et al. | |
| 6,356,545 B1 | 3/2002 | Vargo et al. | |
| 6,389,006 B1 | 5/2002 | Bialik | |
| 6,421,802 B1 | 7/2002 | Schildbach et al. | |
| 6,434,153 B1 | 8/2002 | Yazaki et al. | |
| 6,438,695 B1 | 8/2002 | Maufer | |
| 6,507,562 B1 | 1/2003 | Kadansky et al. | |
| 6,542,508 B1 | 4/2003 | Lin | |
| 6,590,894 B1 | 7/2003 | Kerr et al. | |

(Continued)

OTHER PUBLICATIONS

Schulzrinne, H., et al., "RTP: A Transport Protocol for Real-Time Applications", RFC 3550, Jul. 2003, 89 pages.

(Continued)

*Primary Examiner*—Chi H. Pham
*Assistant Examiner*—Shick Hom
(74) *Attorney, Agent, or Firm*—Stolowitz Ford Cowger LLP

(57) ABSTRACT

In one embodiment, a router receives a real-time multimedia flow that comprises IP packets. The router then processes values included in the Identifier fields of the IP packets using resources similar to those used in the monitoring of RTP flows to identify metrics for the real-time multimedia flow. The metrics may be transferred to a remote management device for aggregation with metrics output by other routers located on the data path for the real-time multimedia flow.

22 Claims, 9 Drawing Sheets

U.S. PATENT DOCUMENTS

| | | |
|---|---|---|
| 6,611,502 B1 | 8/2003 | Seaman |
| 6,629,141 B2 | 9/2003 | Elzur et al. |
| 6,629,414 B2 | 9/2003 | Elzur et al. |
| 6,658,000 B1 | 12/2003 | Raciborski et al. |
| 6,665,637 B2 | 12/2003 | Bruhn |
| 6,671,722 B1 | 12/2003 | Stachura et al. |
| 6,687,360 B2 | 2/2004 | Kung et al. |
| 6,741,600 B1 | 5/2004 | Weiss et al. |
| 6,757,654 B1 | 6/2004 | Westerlund et al. |
| 6,760,309 B1 | 7/2004 | Rocherger et al. |
| 6,801,496 B1 | 10/2004 | Saleh et al. |
| 6,801,525 B1 | 10/2004 | Bodnar et al. |
| 6,847,928 B1 | 1/2005 | Naka |
| 6,854,117 B1 | 2/2005 | Roberts |
| 6,868,069 B2 | 3/2005 | Knobbe et al. |
| 6,909,702 B2 | 6/2005 | Leung et al. |
| 6,928,482 B1 | 8/2005 | Ben Nun et al. |
| 7,010,611 B1 | 3/2006 | Wiryaman et al. |
| 7,013,267 B1 | 3/2006 | Huart et al. |
| 7,036,049 B2 | 4/2006 | Ali et al. |
| 7,055,174 B1 | 5/2006 | Cope et al. |
| 7,062,689 B2 | 6/2006 | Slobodnik |
| 7,139,242 B2 | 11/2006 | Bays |
| 7,154,855 B2 | 12/2006 | Hardy |
| 7,206,385 B2 | 4/2007 | Ethier et al. |
| 7,248,682 B1 | 7/2007 | Oran |
| 7,269,157 B2 | 9/2007 | Klinker et al. |
| 7,286,467 B1 | 10/2007 | Sylvain |
| 7,305,464 B2 | 12/2007 | Philipi et al. |
| 7,324,499 B1 | 1/2008 | Borella et al. |
| 7,436,830 B2 | 10/2008 | Ben-Nun et al. |
| 7,454,494 B1 | 11/2008 | Hedayat et al. |
| 7,483,400 B2 | 1/2009 | Kuusinen et al. |
| 7,496,044 B1 | 2/2009 | Wing |
| 2002/0016856 A1 | 2/2002 | Tallegas et al. |
| 2002/0064273 A1 | 5/2002 | Tomikawa et al. |
| 2002/0075895 A1 | 6/2002 | Yamaguchi et al. |
| 2002/0116501 A1 | 8/2002 | Ho et al. |
| 2002/0131425 A1* | 9/2002 | Shalom ............ 370/401 |
| 2002/0141392 A1 | 10/2002 | Tezuka et al. |
| 2002/0150050 A1 | 10/2002 | Nathanson |
| 2002/0194361 A1 | 12/2002 | Itoh et al. |
| 2003/0014705 A1* | 1/2003 | Suzuki et al. ........ 714/748 |
| 2003/0023710 A1 | 1/2003 | Corlett et al. |
| 2003/0026241 A1 | 2/2003 | Ono et al. |
| 2003/0048786 A1 | 3/2003 | D'Annunzio |
| 2003/0086425 A1 | 5/2003 | Bearden et al. |
| 2003/0117959 A1 | 6/2003 | Taranov |
| 2003/0120789 A1 | 6/2003 | Hepworth et al. |
| 2003/0198249 A1 | 10/2003 | Klein et al. |
| 2003/0204617 A1 | 10/2003 | Buchsbaum et al. |
| 2003/0227917 A1 | 12/2003 | Maher, III |
| 2004/0037267 A1 | 2/2004 | Bennett et al. |
| 2004/0037320 A1 | 2/2004 | Dickson |
| 2004/0042456 A1 | 3/2004 | Dittmann et al. |
| 2004/0071135 A1 | 4/2004 | Jimmei et al. |
| 2004/0073641 A1 | 4/2004 | Minhazuddin et al. |
| 2004/0095894 A1 | 5/2004 | Eloranta et al. |
| 2004/0141502 A1 | 7/2004 | Corson et al. |
| 2004/0179513 A1 | 9/2004 | Smith et al. |
| 2004/0181599 A1 | 9/2004 | Kreusch et al. |
| 2004/0185836 A1 | 9/2004 | Pelaez et al. |
| 2004/0203787 A1 | 10/2004 | Naghian |
| 2004/0252694 A1 | 12/2004 | Adhikari et al. |
| 2004/0264433 A1 | 12/2004 | Melpignano |
| 2005/0102423 A1 | 5/2005 | Pelavin et al. |
| 2005/0182850 A1* | 8/2005 | Kohno ............ 709/236 |
| 2005/0220035 A1 | 10/2005 | Ling et al. |
| 2005/0232227 A1 | 10/2005 | Jorgenson et al. |
| 2005/0243733 A1 | 11/2005 | Crawford et al. |
| 2005/0276276 A1 | 12/2005 | Davis |
| 2006/0002366 A1 | 1/2006 | Kawaguchi et al. |
| 2006/0010243 A1 | 1/2006 | DuRee |
| 2006/0029065 A1 | 2/2006 | Fellman |
| 2006/0031445 A1 | 2/2006 | Rajan et al. |
| 2006/0031510 A1 | 2/2006 | Beck et al. |
| 2006/0059411 A1 | 3/2006 | Dacosta |
| 2006/0106961 A1* | 5/2006 | Ebata et al. ............ 710/52 |
| 2006/0107187 A1 | 5/2006 | Hannuksela |
| 2006/0114855 A1 | 6/2006 | Zheng |
| 2006/0126528 A1 | 6/2006 | Ramalho |
| 2006/0143300 A1 | 6/2006 | See et al. |
| 2006/0182034 A1 | 8/2006 | Klinker et al. |
| 2006/0221837 A1 | 10/2006 | Gardner et al. |
| 2006/0221930 A1 | 10/2006 | Sweeney |
| 2006/0280207 A1 | 12/2006 | Guarini et al. |
| 2007/0036087 A1 | 2/2007 | Kangru |
| 2007/0199052 A1 | 8/2007 | Sankaran et al. |
| 2007/0230486 A1 | 10/2007 | Zafirov |
| 2008/0037864 A1 | 2/2008 | Zhang et al. |
| 2008/0069002 A1 | 3/2008 | Savoor et al. |
| 2008/0159279 A1 | 7/2008 | Younis et al. |
| 2008/0170117 A1 | 7/2008 | Xiao |
| 2008/0220765 A1 | 9/2008 | Chu et al. |
| 2008/0259924 A1 | 10/2008 | Gooch et al. |
| 2008/0285452 A1 | 11/2008 | Oran |
| 2008/0285463 A1 | 11/2008 | Oran |
| 2008/0310316 A1 | 12/2008 | Oran |
| 2008/0317011 A1 | 12/2008 | Datta et al. |
| 2009/0119722 A1 | 5/2009 | VerSteeg |

OTHER PUBLICATIONS

Friedman, T., et al., "RTP Control Protocol Extended Reports (RTCP XR)", RFC 3611, Nov. 2003, 55 pages.
J. Postel, "User Datagram Protocol," Retrieved from http://www.faqs.org/rfcs/rfc768.html on Jun. 13, 2009, Originally published Aug. 28, 1980, pp. 1-3.
Pendleton, et al., Session initiation Package for Voice Quality Reporting Event, Sipping Working Group, 2006, pp. 1-24.
Liao et al., Adaptive recovery techniques for real-time audio streams, IEE INFOCOM 2001. Twentieth Annual Joint Conference of the IEEE Computer and Communications Societies. Proceedings. Apr. 22-26, 2001, vol. 2, pp. 815-823.
R. Braden; Network Working Group; Requirements for Internet Hosts- Communication Layers; Oct. 1989, pp. 1-115.
Information Sciences Institute, University of Southern California; Internet Protocol DARPA Internet Program Protocol Specification; Sep. 1981; pp. 1-49.
Information Sciences Institute, University of Southern California; Transmission Control Protocol, DARPA Internet Program Protocol Specification; Sep. 1981; pp. 1-88.
D. Singer and Desineni, "A General Mechanism for RTP Header Extensions", draft-ietf-avt-rtp-hdrext-12txt, Feb. 26, 2007.
Stolowitz Ford Cowger Listing of Related Cases, Dec. 17, 2009.
Welch, A Proposed Media Delivery Index (MDI); Apr. 2006; RFC 4445.
Degermark, IP Header Compression; Feb. 1999; RFC 2507.
Rosenberg, An Offer/Answer Model with Session Description Protocol (SDP); Jun. 2002; RFC 3264.
Jonsson; Robust Header Compression (ROHC): A Link-Layer Assisted Profile for IP/UDP/RTP; Jan. 2006; RFC 4362.
B. Thompson, Tunneling Multiplexed Compressed RTP (TCRTP); Nov. 2005; RFC 4170.
Kevin Song X., "The ABC's of Network Security", The Certified Security Professional, Certification Magazine, Feb. 2004.
T.V. Lakshman et al. High-Speed Policy-Based Packet Forwarding Using Efficient Multi-Dimensional Range Matching. 1998, ACM SIGCOMM Computer Communication Review, vol. 28 No. 4.
Hamzeh, K., Pall G., Verthein, W. Taarud, J., Little, W. and G. Zorn, "Point-to-Point Tunneling Protocol (PPTP)", RFC 2637, Jul. 1999.

* cited by examiner

US 7,817,546 B2

QUASI RTP METRICS FOR NON-RTP MEDIA FLOWS

TECHNICAL FIELD

The present disclosure relates generally to the field of networking.

BACKGROUND

A data flow between two endpoints over a packet switched network can experience packet loss and delays when an on-path intermediary link or device is overloaded or for many other reasons. Packet loss and delay of real-time media flows need to be monitored for numerous management reasons such as to identify where on the path the packet loss and the delays are occurring and to determine whether the packet loss and delays are unacceptable in magnitude.

The Real-Time Protocol (RTP) was designed to natively support robust flow monitoring techniques. Accordingly, when an RTP flow passes through a network device the quality of the RTP flow at that network device can be monitored for outputting RTP metrics that include loss, jitter and latency information. A management device may then aggregate the RTP metrics with RTP metrics output by other network devices on the data path. The aggregated information is then typically used for service monitoring and troubleshooting.

Other protocols besides RTP, such as the Internet Protocol version Four (IPv4), do not support the flow monitoring features of RTP, which makes monitoring these non-RTP flows using existing RTP monitoring resources difficult or impossible. The disclosure that follows solves this and other problems.

DESCRIPTION OF EXAMPLE EMBODIMENTS

Overview

Figure 1:
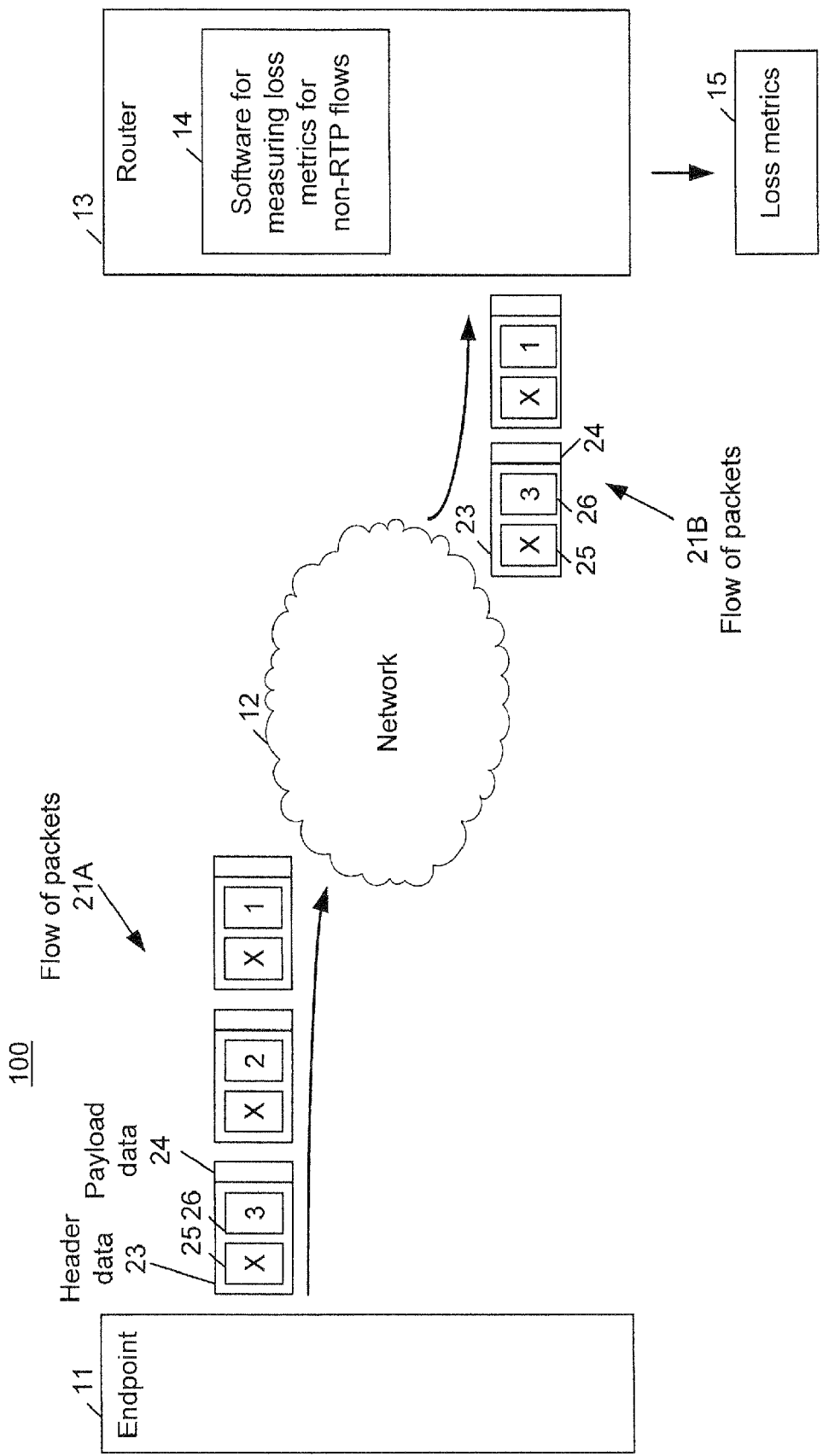
FIG. 1 illustrates an example router for monitoring an Internet Protocol (IP) flow and outputting loss metrics.

In one embodiment, a router receives a real-time multimedia flow that comprises IP packets. The router then processes values included in the Identifier fields of the IP packets using resources similar to those used in the monitoring of RTP flows to identify metrics for the real-time multimedia flow. The metrics may be transferred to a remote management device for aggregation with metrics output by other routers located on the data path for the real-time multimedia flow.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates an example router for monitoring an Internet Protocol (IP) flow and outputting loss metrics.

The system 100 includes one or more on-path network devices, such as router 13, that monitor a real-time unicast or multicast media flow such as an Internet Protocol TeleVision (IPTV) flow. The router 13 includes software 14 for measuring loss metrics 15 for the media flow while forwarding the media flow. The loss metrics 15 are output to a management device for correlation and aggregation with other loss metrics outputted by other network devices (not shown) on the data path.

In the present embodiment, the endpoint 11 is a conventional endpoint that originates a flow of packets 21A using the IPv4 protocol. Each of the packets in the flow 21A includes payload data 24 and header data 23 including both an IP header and a UDP header. The header data 23 includes addressing information 25 that can be used as a flow classifier X for the flow 21A. The addressing information 25 includes source and destination addresses (from the IP header) and source and destination UDP port numbers (from the UDP header), which are combinable to constitute the flow classifier X for the flow 21A. Each of the packets in the flow 21A also includes a sixteen bit identification field 26 located in the IP header. According to conventional behavior, the endpoint 11 inserts different sixteen-bit values for use during IP packet fragmentation into the identification field 26 of the packets in the flow 21A.

A background on fragmentation is helpful before continuing the specific example in FIG. 1. The IP protocol designates that the identification field 26 includes values for use by an intermediary device during fragmentation of the packets. For example, when a large IP packet is transferred by the endpoint 11 an intermediary device may fragment the large IP packet into a plurality of smaller IP packets. To ensure that a destination endpoint can reassemble the smaller IP packets into the original large IP packet, the identification fields 26 included in the IP headers of each of the smaller IP packets receive the same value as the identification field 26 of the larger IP packet and fragment offset fields of the smaller packets are formatted. This allows a destination endpoint to reassemble the large IP packet by correlating received packets having a common identification field value.

Continuing the example in FIG. 1, the endpoint 11 may be configured to select different packet identifiers for inserting into the identification field 26 of each of the packets in the flow 21A using a variety of different value selection techniques. In the present embodiment, the endpoint 11 is a type that inserts monotonically increasing sixteen-bit values into the identifications fields 26 of the packets of each flow independently. For example, the first transferred packet receives a value of one ("0000 0000 0000 0001" or "1"), the second transferred packet receives a value of two ("0000 0000 0000 0010" or "2") and the third transferred packet receives a value of three ("0000 0000 0000 0011" or "3"). Other value selection techniques are known to be used by other endpoints, for example, descending value selection (counting down from a value of two to the sixteenth power) or ascending selection occurring in any scale such as by tens (10, 20, 30 . . . ) or hundreds (100, 200, 300 . . . ). An example embodiment specifically addressing endpoints using these non-monotonically increasing selection techniques will be discussed in greater detail in FIG. 4.

Referring again to FIG. 1, the media flow 21A is then transferred by the endpoint 11 through the network 12 towards a destination endpoint. While traveling through the network 12, the media flow 21A may experience packet loss such that the media flow 21B received by the router 13 is missing the second transferred packet.

The router 13 preferably determines whether the flow 21B requires fragmentation or not using any method, for example, by analyzing whether the "Do Not Fragment" bit is set in the IP header included in the header data 23 to explicitly prohibit fragmentation. Alternatively the router 13 may make this determination according to received signaling indicating that flow monitoring may be performed on the flow 21B having flow classifier X or by accessing a local memory indicating that flow monitoring may be performed on the flow 21B.

When the router 13 determines that fragmentation is prohibited or otherwise not used for the flow 21B, the router 13 determines whether the endpoint 11 populated the identification fields 26 with monotonically increasing values using any method. For example, the router 13 may be preconfigured by a user with this information, the router 13 may exchange signaling with the endpoint 11 or another network device to acquire this information, the router 13 may make this determination by analyzing empirical evidence gathered from traffic originating from the endpoint 11, the router 13 may access a local or remote table listing source addresses known to use a monotonically increasing value selection, etc.

When the router 13 determines that the flow 21B is transmitted from a device that uses per-flow monotonically increasing value selection, the router 13 leverages this fact to determine packet loss by analyzing the identification field 26 of each packet identified by flow classifier X. In other words, the router 13 can monitor values of received packets to identify missing values, from which the router can infer the loss of one or more packets. For example, when the router 13 observes that none of the received packets include the value two (2), the router 13 infers that the second transferred packet has been lost.

Importantly, since the values in the identification field are sixteen-bit values and increment by one like RTP sequence numbers, the router 13 may use the exact same algorithms used for calculating RTP metrics. In other words, generally speaking any hardware or software that receives RTP sequence numbers and outputs RTP metrics is compatible and can be directly fed the values from the identification fields of the IP packets. This feature is illustrated in greater detail later with reference to FIG. 9.

Referring still to FIG. 1, information about the packet loss is included in the loss metrics 15 that are preferably transferred from the router 13 to a remote management device for correlation and aggregation. For scalability reasons and to minimize the amount of bandwidth consumed by transferring the loss metrics 15 to the remote management device, the router 13 may perform any of the techniques for monitoring real-time multimedia streams using Real-time Transport Control Protocol (RTCP) tunneling as described in U.S. patent application Ser. No. 11/761,679, which is herein incorporated by reference in its entirety for all purposes. The remote management device can then compare the loss metrics 15 to other loss metrics from other on-path network devices to determine what portion of the network 12 is associated with packet loss. This information may be used by the management device to reconfigure network devices, to notify an administrative user, or to perform other operations.

Although the router 13 is described as monitoring packet loss for media flows originating from endpoints using a monotonically increasing value selection it should be apparent that the router 13 can also be configured to monitor packet loss when other patterns of value selection are used (although use of other patterns will not necessary allow for leveraging of existing RTP metric calculation algorithms). For example, the router 13 can also observe packet loss by using identification fields 26 when an endpoint uses monotonically decreasing value selection or any other value selection method as long as that criterion is known to the router 13. Although the packets in the media flow 21A are IP packets, it should be apparent that the router 13 can output flow metrics for packets sent using other protocols that define an identification field or other field used for indicating values used during fragmentation and reassembly.

Figure 2:
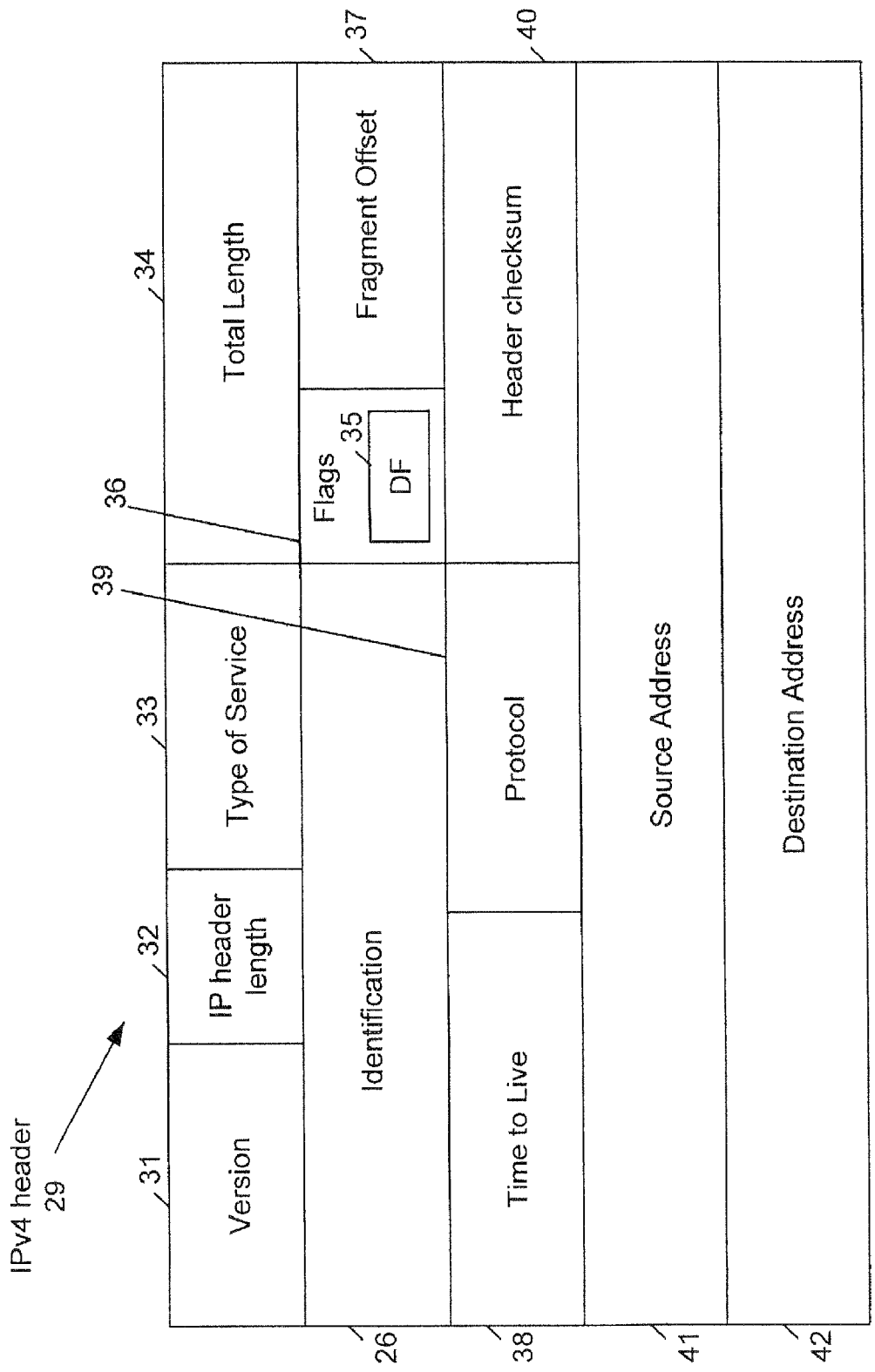
FIG. 2 illustrates an example IP version Four (IPv4) header that is analyzed by the router illustrated in FIG. 1 during the flow monitoring.

FIG. 2 illustrates an example IP version Four (IPv4) header that is analyzed by the router illustrated in FIG. 1 during the flow monitoring.

The IPv4 header 29 includes the sixteen bit identification field 26 conventionally used for denoting the packet identifiers that are used for indicating an association between packet fragments during reassembly. The header 29 also includes a version field 31, an IP header length field 32, a type of service field 33, a total length field 34, a flags field 36, a fragment offset field 37, a time to live field 38, a protocol field 39, a header checksum field 40, a source address field 41 and a destination address field 42. The source address field 41 and the destination address field 42 include the addresses that are combinable with the UDP port numbers included in the UDP header to constitute the flow classifier X (FIG. 1). The flags field 36 includes a one bit field 35 used by an endpoint for indicating "Don't Fragment" (DF).

Referring again to FIG. 2, the fragment offset field 37 is conventionally used by a fragmenting device to insert a byte count from the start of the first fragmented packet sent by the fragmenting device. This byte count is used by a destination endpoint to reassemble received fragmented packets in order according to the respective byte counts so that the original pre-fragmented packet can be restored.

Figure 3:
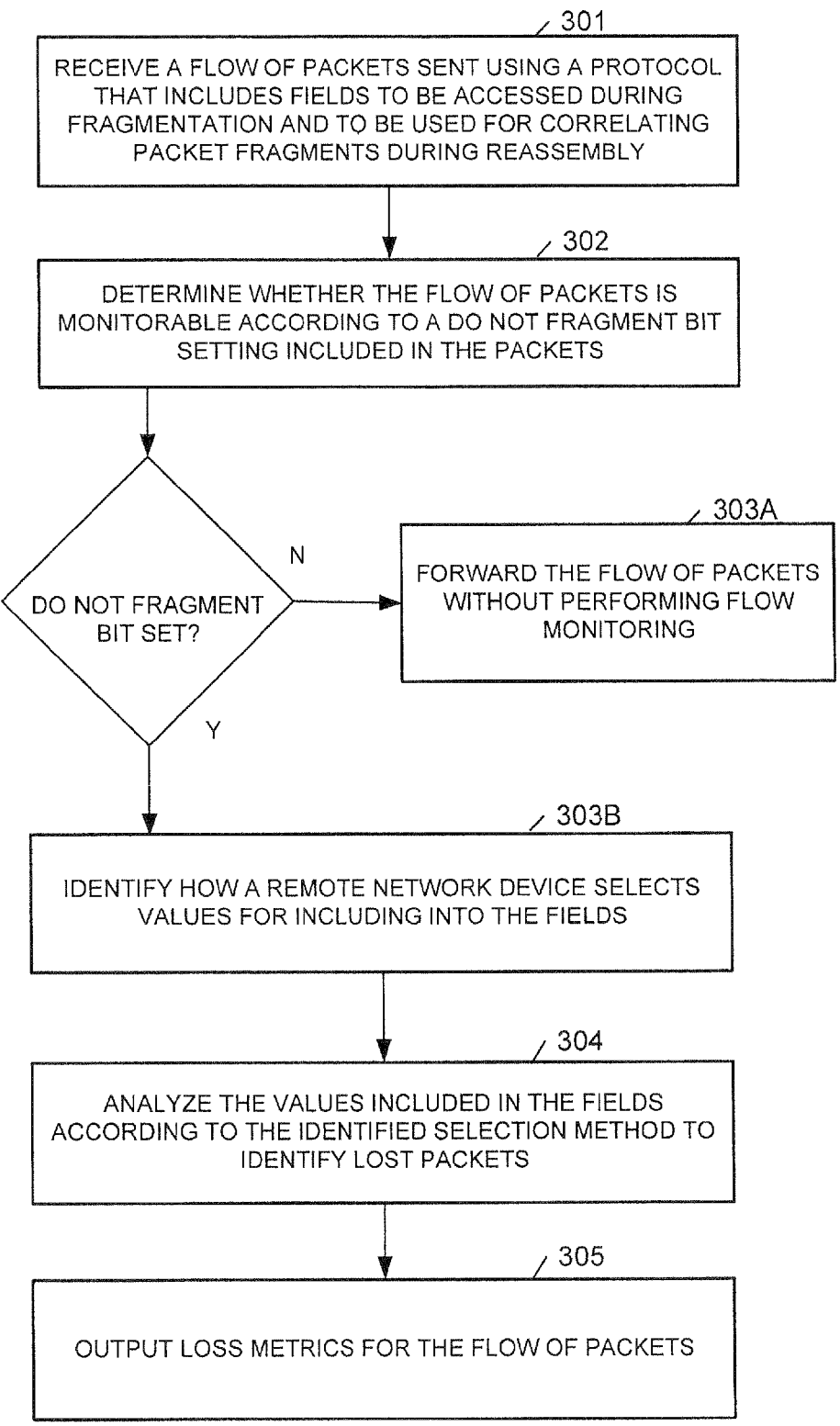
FIG. 3 illustrates an example method for using the router illustrated in FIG. 1.

FIG. 3 illustrates an example method for using the router illustrated in FIG. 1.

In block 301, the router 13 receives a flow of packets sent using IP or another protocol that includes fields to be accessed during fragmentation and to be used for correlating packet fragments during reassembly. When the protocol is IPv4, the fields are sixteen bit identification fields.

In block 302, the router 13 determines whether the flow of packets is monitorable according to a do not fragment bit setting or other means. When the flow does not prohibit fragmentation, in block 303A the router 13 forwards the flow of packets without performing flow monitoring.

When the flow requests no fragmentation, the router 13 identifies how a remote network device selects values for including into the fields in block 303B. The router 13 may access an input received during pre-configuration of the router 13 by a user, access an indication transferred from the remote network device, access a field included in one or more of the packets, or analyze empirical analysis of the flow or of other flows transferred from the remote network device, etc. The router 13 then analyzes the values included in the fields according to the identified selection method (preferably a monotonically or by one increasing selection pattern) to identify lost packets in block 304. The router 13 may output loss metrics for the flow of packets to a user or a remote management device in block 305.

Figure 4:
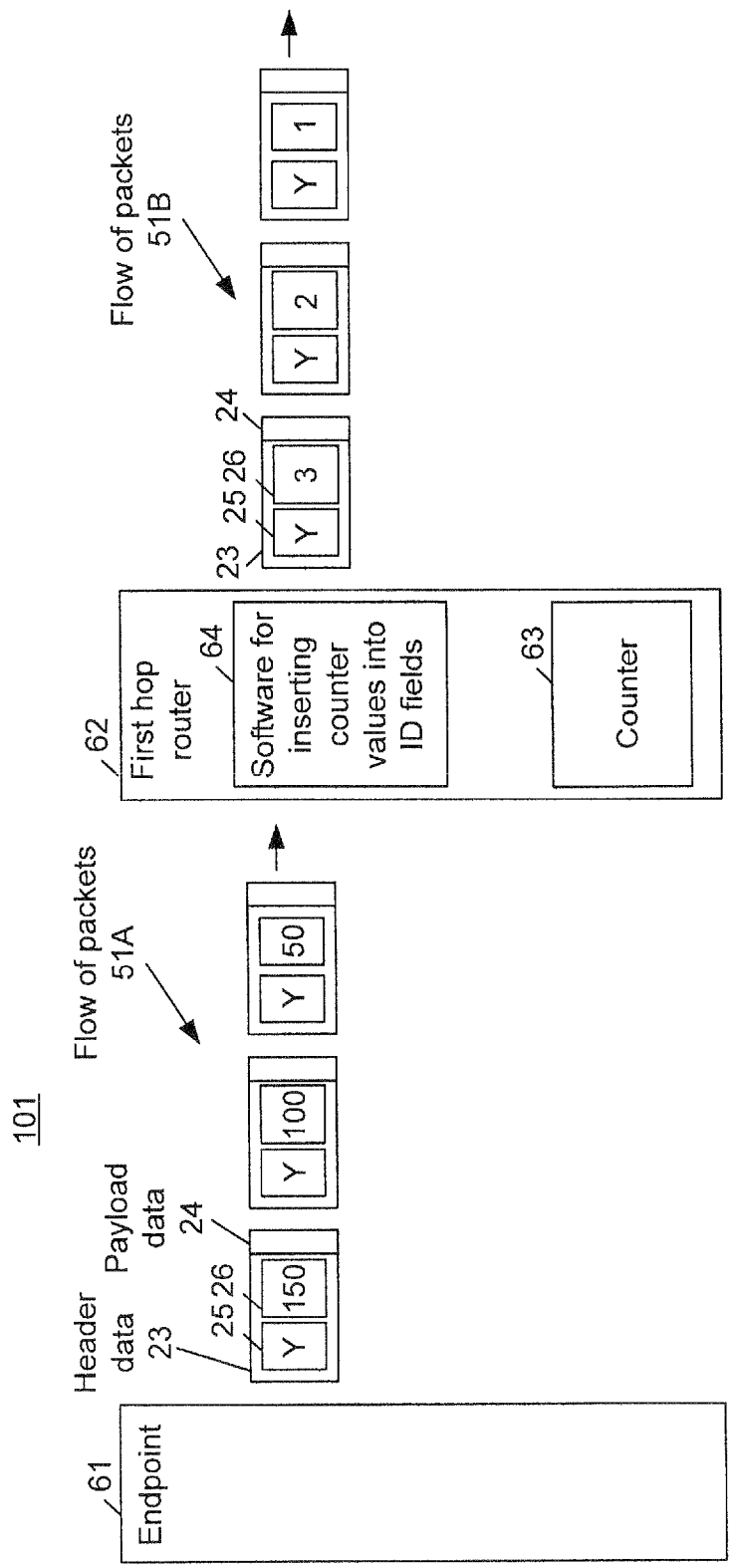
FIG. 4 illustrates another example router for reformatting an IP flow to allow other on-path network devices to monitor the reformatted flow regardless of source endpoint behavior.

FIG. 4 illustrates another example router for reformatting an IP flow to allow other on-path network devices to monitor the reformatted flow regardless of source endpoint behavior.

In the system 101, a network device in close logical proximity to the endpoint 61, such as a first hop router 62, reformats the values included in the identification field 26 when the originating endpoint formats the flow 51A using a method other than monotonically increasing selection. In this example, the endpoint 61 assigns a value of fifty (50) to the first transferred packet, a value of one hundred (100) to the second transferred packet and a value of one hundred and fifty (150) to the third transferred packet.

The router 62 receives the flow 51A and according to software 64 determines whether the flow 51A requires fragmentation or not before formatting different values into the fragmentation field 26. For example, real-time multimedia flows such as IPTV media flows normally do not use fragmentation. The router 62 makes this determination using any method, for example, by analyzing whether the "Do Not Fragment" bit is set in the IP header in the header data 23. Alternatively the router 62 may make this determination according to received signaling indicating that flow monitoring may be performed for this flow 51A having flow classifier Y or by accessing a local memory indicating that flow monitoring may be performed for this flow 51A.

When the flow 51A is a type that may be monitored, the router 62 reformats the identification field 26 of each packet having the common flow classifier Y to correspond with a value from a sixteen-bit counter 63. For example, the value of fifty (50) is replaced with the value of one ("0000 0000 0000 0001" or "1") from the counter 63. The counter 63 is incremented and the next counter value of two ("0000 0000 0000 0010" or "2") is used to overwrite the identification field 26 of the next packet and so on and so forth. The resulting flow 51B of reformatted packets includes identification fields 26 containing values that monotonically increase per packet similar to how sequence numbers in an RTP flow work. Accordingly, another on-path network device that includes the software 14 (FIG. 1) can output loss metrics for the reformatted media flow 51B. Replacing non-monotonically increasing values in the identification fields 26 with monotonically increasing values is preferred so that existing RTP metric engines can be leveraged as will be explained in greater detail with reference to FIG. 9.

Although in the present embodiment a network device remote from the endpoint 61 is used to reformat the identification fields 26, in other embodiments signaling may be used to control how the endpoint 61 selects values for inserting into identification fields 26. When the endpoint 61 is controlled using signaling, the router 62 may include the software 14 (FIG. 1) instead of the software 64 and the counter 63.

Figure 5:
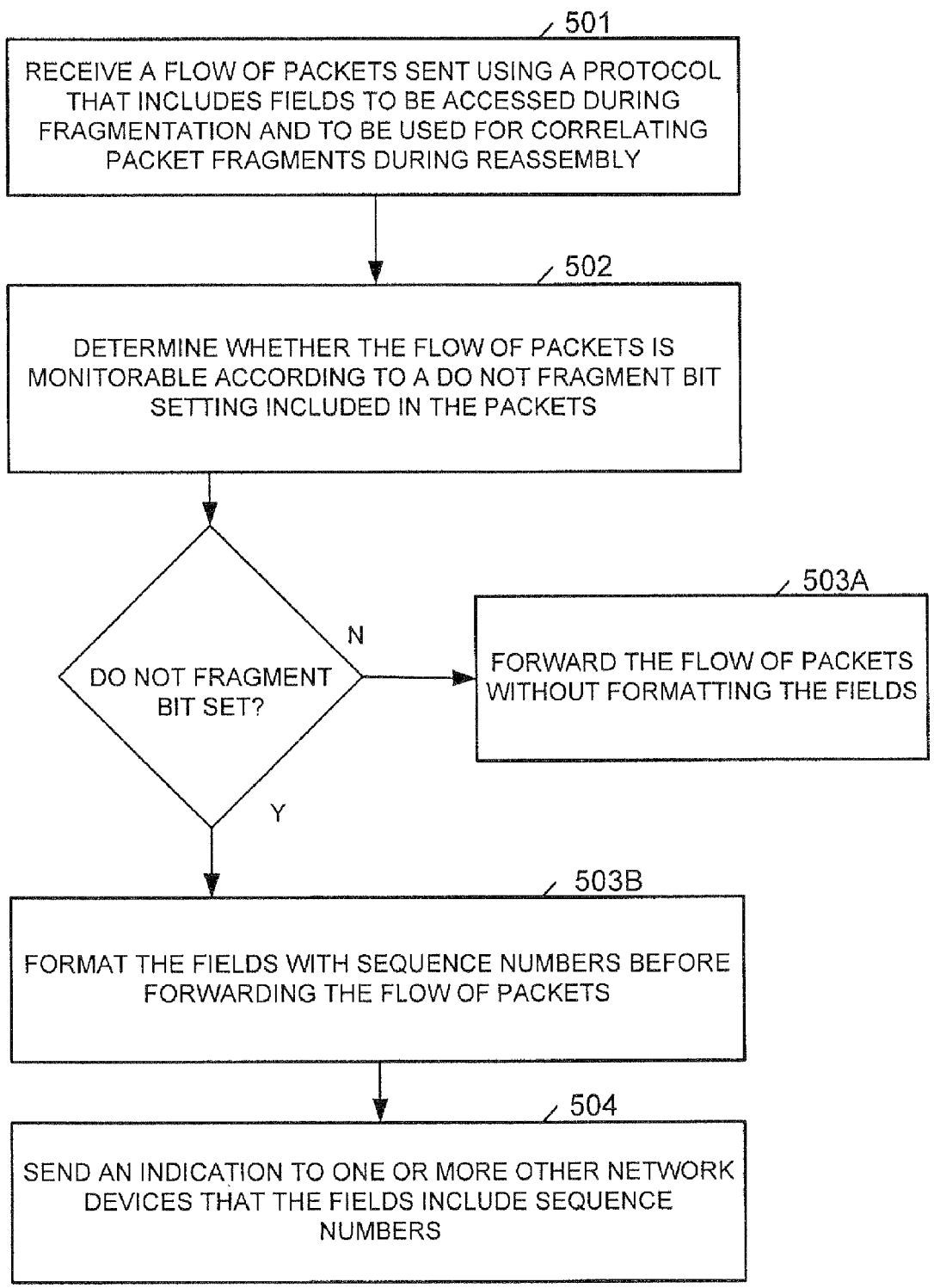
FIG. 5 illustrates an example method for using the router illustrated in FIG. 4.

FIG. 5 illustrates an example method for using the router illustrated in FIG. 4.

In block 501, the router 62 receives a flow of packets sent using IP or another protocol that includes fields to be accessed during fragmentation and to be used for correlating packet fragments during reassembly. When the protocol is IPv4, the fields are sixteen bit identification fields.

In block 502, the router 62 determines whether the flow of packets is monitorable according to a do not fragment bit setting or other means. When the flow does not prohibit fragmentation, in block 503A the router 62 forwards the flow of packets without formatting the fields.

When the flow requests no fragmentation, in block 503B the router 62 formats the fields with sequence numbers or other monotonically increasing values before forwarding the flow of packets. In block 504, the router 62 may send an indication to one or more other network devices also located on the data path that the fields include the sequence numbers.

Figure 6:
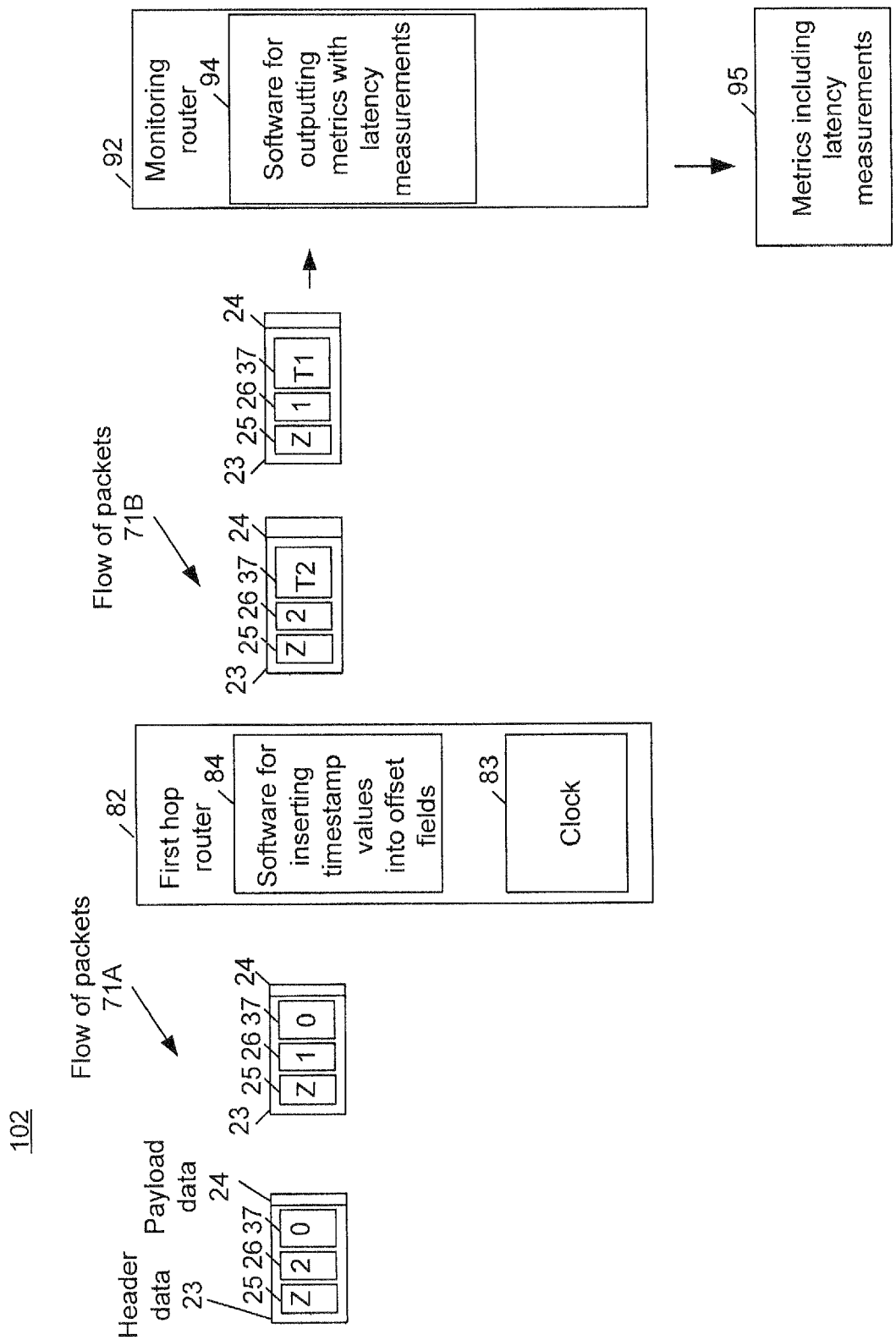
FIG. 6 illustrates yet another example router for reformatting an IP flow to allow other on-path network devices to measure latency for the reformatted flow.

FIG. 6 illustrates yet another example router for reformatting an IP flow to allow other on-path network devices to measure latency for the reformatted flow.

In the system 102, a device close to a transmitting endpoint (transmitting endpoint not shown), such as a first hop router 82, reformats the fragment offset fields 37 with values from a clock 83. The timestamps or other clock values in the fragment offset fields 37 are used by other on-path devices such as monitoring router 92 to output metrics 95 that include latency measurements in addition to, or instead of, the loss information.

For example, the router 82 receives a flow 71A of packets each having header data 23 including a fragment offset field 37 and information combinable with UDP port numbers to constitute a flow classifier Z. When the fragment offset field 37 is set to zero indicating that the packets have not been fragmented and the router 82 is preconfigured with knowledge that other devices on the data path are compatible with the timestamp reformatting, the router 82 begins reformatting the field 37 with values from the clock 83. Accordingly, the fragmentation offset field 37 for the first packet in the outputted flow 71B indicates the time value T1 and the second packet in the flow 71B indicates the time value T2.

Another device on the data path, such as monitoring router 92, receives the flow 72 and observes the timestamp values T1 and T2 included in the fragmentation offset fields 37. According to the observed timestamp values T1 and T2 and an input (such as signaling from router 82) that indicates to the monitoring router 92 the format and a time reference for the timestamp values, the monitoring router 92 identifies latency measurements. The time reference refers to a type of timestamp used, such as sixty-four (64) bit Network Time Protocol (NTP) timestamps, and the format refers to which subset of the sixty-four (64) bit is inserted into the thirteen (13) bit fragment offset field. A preferred format uses the thirteen (13) bit subset starting at bit thirty-one (31) and ending at bit forty-three (43) providing coverage of two (2) seconds with a resolution of approximately two-hundred and forty-five (245) microseconds. Other time references and subsets are possible.

These latency measurements can be quasi RTP latency measurements that indicate how much time it takes for a packet to travel from a device close to the source to other devices on the data path. This latency information can be output in metrics 95 for aggregation, which can be used to determine which portion of the network is causing the largest delay.

In other embodiments, the source device inserts the timestamps rather than an intermediary device. Also, the system preferably includes a last hop device or some other device close to the destination endpoint that resets the values in the fragmentation offset fields 37 to a zero byte count for compatibility reasons. This may occur in conjunction with measuring latency at the last hop device. Destination endpoints may also include software for ignoring the fragmentation offset fields when the "do not fragment" flag is set so that writing zero values into these fields is unnecessary.

Figure 7:
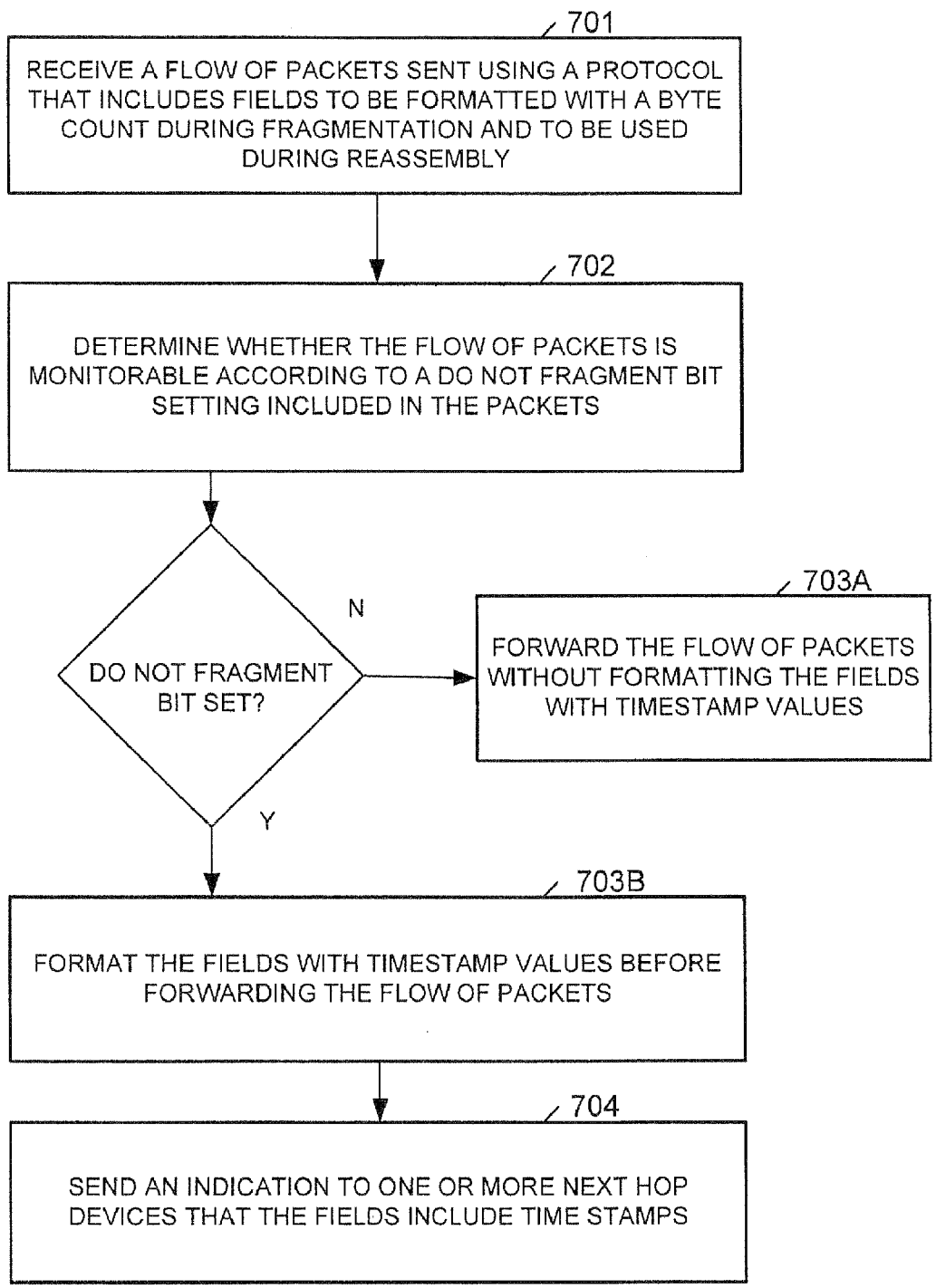
FIG. 7 illustrates an example method for using the router illustrated in FIG. 6.

FIG. 7 illustrates an example method for using the router illustrated in FIG. 6.

In block 701, the router 82 receives a flow of packets sent using IP or another protocol that includes fields to be formatted with a byte count during fragmentation and to be used during reassembly. When the protocol is IPv4, the fields are the fragmentation offset fields.

In block 702, the router 82 determines whether the flow of packets is monitorable according to a do not fragment bit setting or other means. When the flow does not prohibit fragmentation, in block 703A the router 82 forwards the flow of packets without reformatting the fields with timestamp values.

When the flow requests no fragmentation, in block 703B the router 82 formats the fields with timestamp values before forwarding the flow of packets. In block 704, the router 82 may send an indication to one or more other devices located on the data path that the fields include the time stamps.

In addition to the above-described functionality, it should be apparent that the router 82 may also include the functionality illustrated in FIG. 5. For brevity the functionality illustrated in FIG. 5 is not repeated in FIG. 7.

Figure 8:
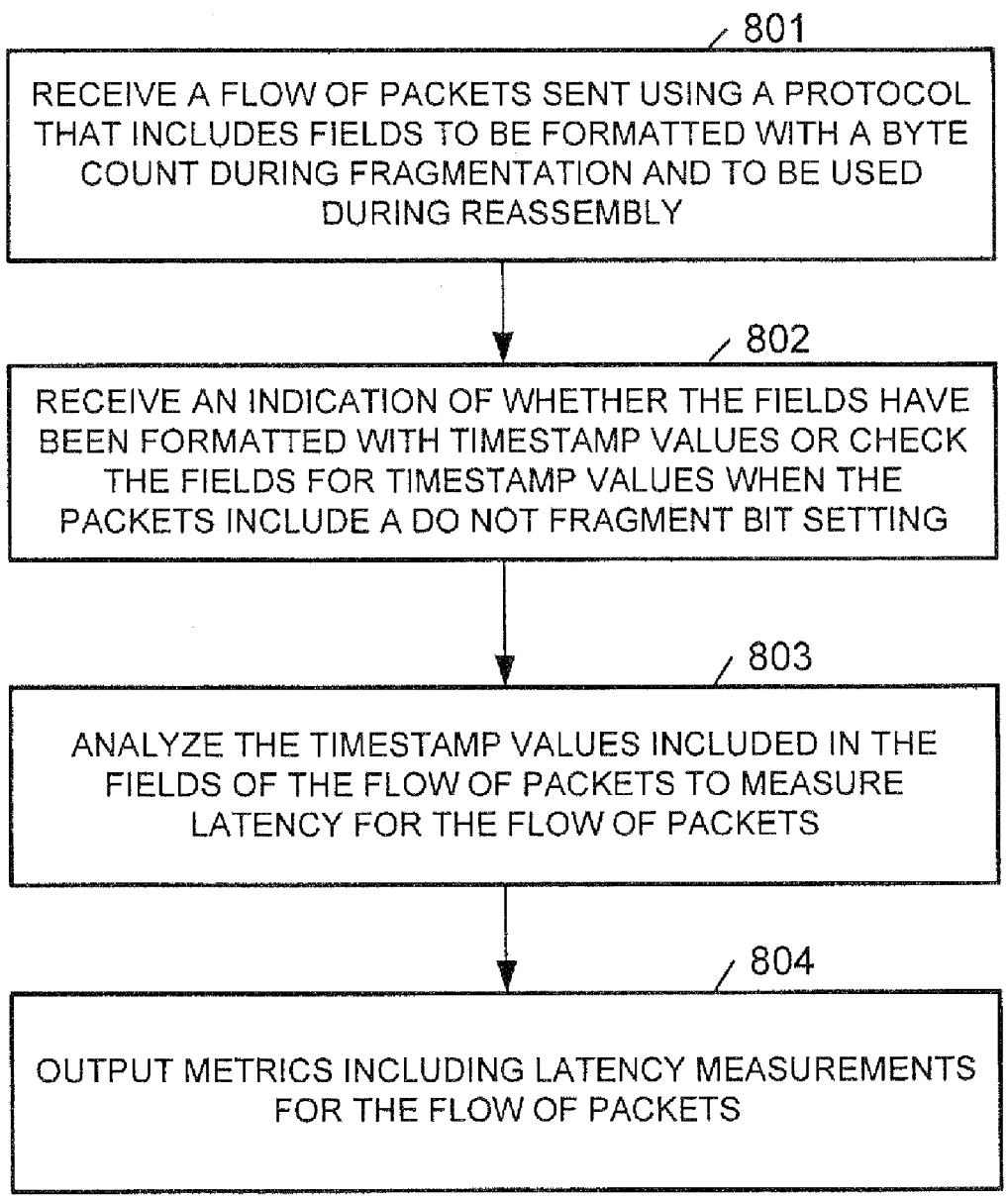
FIG. 8 illustrates an example method for using a monitoring device illustrated in FIG. 6.

FIG. 8 illustrates an example method for using a monitoring device illustrated in FIG. 6.

In block 801, the router 92 receives a flow of packets sent using IP or another protocol that includes fields to be formatted with a byte count during fragmentation and to be used during reassembly. When the protocol is IP, the fields are the fragmentation offset fields.

In block 802, the router 92 receives an indication of whether the fields have been formatted with timestamp values. The indication may be received during pre-configuration of the router 92 by a user, the indication may be transferred from a remote network device, the indication may be included in one or more of the packets, the indication may be based on empirical analysis of the flow or of other flows transferred from the remote network device, etc. The router 92 may also simply check the fields for timestamp values when the packets request no fragmentation. The router 92 then analyzes the timestamp values included in the fields to measure latency for the flow of packets in block 803. The router 92 may output metrics including the latency measurements to a user or a remote management device in block 804.

In addition to the above-described functionality, it should be apparent that the router 92 may also include the functionality illustrated in FIG. 3. For brevity the functionality illustrated in FIG. 3 is not repeated in FIG. 8.

Figure 9:
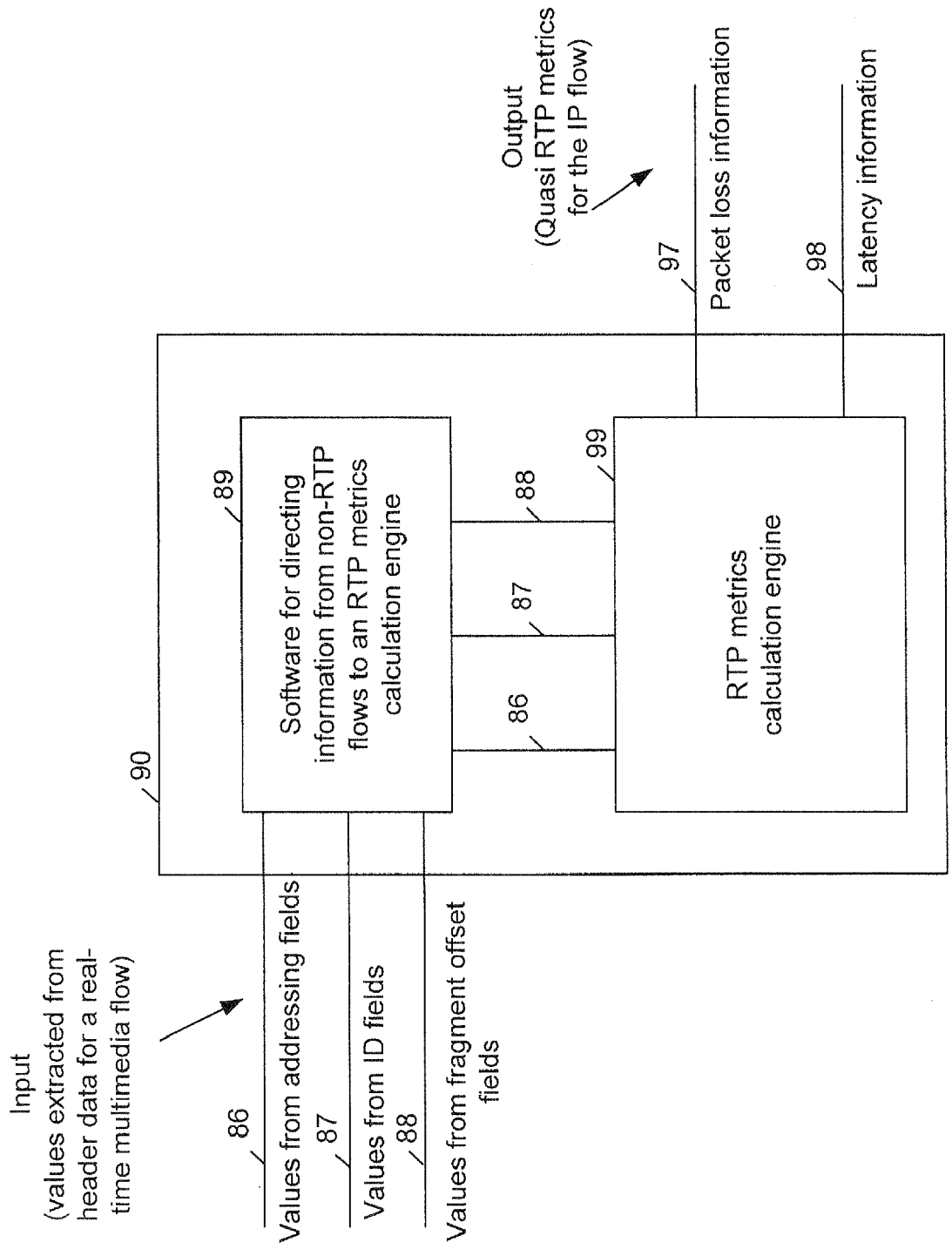
FIG. 9 illustrates an example device that leverages a Real-Time Protocol (RTP) metrics calculation engine to determine quasi RTP metrics for a non-RTP flow.

FIG. 9 illustrates an example device that leverages a Real-Time Protocol (RTP) metrics calculation engine to determine quasi RTP metrics for a non-RTP flow.

The device 90 includes software 89 for feeding information extracted from non-RTP media flows into an RTP metrics calculation engine 99. This leverages the engine 99 that is capable of calculating RTP metrics for RTP media flows to also calculate quasi RTP flow metrics for non-RTP media flows.

For example, the inputs 86, 87 and 88 respectively include flow classifier information extracted from addressing fields of packets in an IP media flow, quasi sequence number values extracted from identification fields of the IP packets and timestamp values extracted from fragment offset fields of the IP packets. These inputs 86, 87 and 88 are fed into the engine 99 in a similar fashion to how information extracted from an RTP media flow is fed into the engine 99. The engine 99 processes the inputs 86, 87 and 88 similarly to how RTP information is processed, and outputs quasi RTP metrics including packet loss information 97 and latency information 98. In other embodiments the device 90 receives a subset of the inputs 86, 87 and 88 and outputs a subset of the outputs 97 and 98.

The engine 99 may process RTP algorithms such as those disclosed in Request For Comment (RFC) 3550 and 3611, which are herein incorporated by reference for all purposes and are publicly available on the Internet Engineering Task Force (IETF) website. The engine 99 may utilize any other RTP algorithms and RTP resources to output the quasi RTP metrics for the IP media flow.

The specific examples herein describe routers outputting flow metrics and reformatting fields. It should be apparent that in other examples any network devices on a data path may perform the functionality described herein, including but not limited to, switches, gateways, call management devices, Network Address Translation (NATs), firewalls and other security devices, etc. The reformatting routers may include functionality to measure flows, and the measuring routers may include functionality for reformatting flows. Reformatting routers may reformat fragment offset fields and identification fields, or only one type.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof it should be apparent that the invention may be modified in arrangement and detail without departing from such principles. I claim all modifications and variation coming within the spirit and scope of the following claims.

The invention claimed is:

1. A method, comprising:
receiving an input indicating how a remote network device populates fields designated to be accessed during fragmentation and reassembly, wherein the fields are fragmentation fields of Internet Protocol (IP) headers;
receiving a flow of packets that are transferred by the remote network device and that include the IP headers with the populated fragmentation fields;
determining whether the flow of packets requests no fragmentation;
only when the flow of packets requests no fragmentation, analyzing different values included in the fragmentation fields of the IP headers to identify metrics for the received flow of packets; and
outputting the metrics for the received flow of packets.

2. The method of claim 1, further comprising:
wherein the different values are each sixteen-bit values; and
processing the sixteen-bit values using one or more Real-Time Protocol (RTP) metrics algorithms to identify the metrics for the received flow that is a non-RTP flow.

3. The method of claim 1, further comprising overwriting unique identifiers included in the fragmentation fields of the IP headers with the different values before forwarding the flow of packets towards a destination endpoint.

4. The method of claim 3, wherein the different values comprise sequence numbers.

5. A method, comprising:
identifying packet fields for specifying unique identifiers initially designated for use during correlation and reassembly of fragmented messages, wherein the fields are fragmentation fields of IP headers;
determining whether the packets request no fragmentation;
only when the packets request no fragmentation, formatting the identified packet fragmentation fields of the IP headers with different values before forwarding packets having the packet fragmentation fields; and
analyzing the different values of the packet fragmentation fields of the IP headers after the packets are forwarded to identify lost ones of the forwarded packets.

6. The method of claim 5, further comprising replacing unique identifiers included in the identified packet fragmentation fields of the IP headers with the different values at a forwarding device located remotely with respect to a transmitting source that formats the fragmentation fields of the IP headers with the unique identifiers.

7. The method of claim 5, further comprising replacing fragmentation offset values included in the packets with timestamp values at an intermediary device located on a data path for the packets.

8. The method of claim 7, further comprising replacing the timestamp values with zero values before the packets are received on a destination endpoint.

9. The method of claim 8, further comprising determining latency information for the packets according to the inserted timestamp values.

10. An apparatus, comprising:
one or more processors; and
a memory coupled to the processors comprising instructions executable by the processors, the processors operable when executing the instructions to:
receive a stream of packets sent using a protocol that supports fragmentation, the packets including fields designated by the protocol for use during packet fragmentation and packet reassembly;
identify a pattern used for selecting different values to include into the fields; and
only when a 'do not fragment' bit is set in the packets, analyze the different values included in the fields according to the identified pattern to measure packet loss for the stream.

11. The apparatus of claim 10, wherein the protocol is the Internet Protocol (IP) and the fields are sixteen-bit identifier fields.

12. The apparatus of claim 10, wherein the processors are further operable to analyze the different values included in the fields only when the identified pattern is a monotonically increasing selection pattern.

13. The apparatus of claim 10, wherein the processors are further operable to identify the pattern according to a pre-configuring input specifying that a source endpoint for the stream of packets uses the identified pattern.

14. The apparatus of claim 10, wherein the processors are further operable to identify the pattern during a signaling exchange with a remote forwarding device that is located on a data path for the stream of packets and that reformats the fields using monotonically increasing sixteen-bit values.

15. The apparatus of claim 10, wherein the processors are operable to output a communication that identifies the packet loss for accumulation with loss metrics output by remote network devices located on a data path for the stream of packets.

16. The apparatus of claim 10, further comprising:
an RTP metrics calculation engine;
wherein the processors are further operable to feed the different values into the RTP metrics calculation engine when the protocol is the Internet Protocol (IP).

17. The apparatus of claim 10, wherein the processors are further operable to analyze the different values to determine the packet loss when a setting included in a local memory or received signaling requests flow monitoring for the stream.

18. An apparatus, comprising:
one or more processors; and
a memory coupled to the processors comprising instructions executable by the processors, the processors operable when executing the instructions to:
receive a stream of packets sent using a protocol that supports fragmentation, the packets including fields designated by the protocol for use during packet fragmentation and packet reassembly;
determine whether the stream of packets requests no fragmentation; and
only when the stream of packets requests no fragmentation, format the fields that are designated by the protocol for use during packet fragmentation and packet reassembly with timestamp values before forwarding the stream of packets.

19. The apparatus of claim 18, wherein the processors are further operable to forward the stream of packets without formatting the fields when the stream of packets does not request no fragmentation.

20. The apparatus of claim 18, wherein the apparatus inserts the timestamp values in an ordering that allows a remote network device to measure latency for the stream of packets by reading the fields designated by the protocol for use during packet fragmentation and packet reassembly.

21. The apparatus of claim 18, wherein the timestamp values correspond to a subset of bits from Network Time Protocol (NTP) timestamps.

22. The apparatus of claim 21, wherein the fields are thirteen bit fields and the subsets of bits correspond to a range including the thirty-first and forty-third bits of the NTP timestamps.

* * * * *